3,488,331
POLYMERS OF ALKOXY ALKYL ACRYLATES, ALKYL ACRYLATES AND VINYL OR ALLYL CHLOROACETATE
August H. Jorgensen, Jr., Avon Lake, Ohio, assignor to The B. F. Goodrich Company, New York, N.Y., a corporation of New York
No Drawing. Filed May 6, 1968, Ser. No. 727,064
Int. Cl. C08f 15/40
U.S. Cl. 260—80.76                                10 Claims

ABSTRACT OF THE DISCLOSURE

Acrylate elastomers having an improved balance of low temperature flexibility and oil resistance, which are readily vulcanized, are prepared with greater than 25% alkoxy alkyl acrylate, less than 70% alkyl acrylate and about 0.5 to less than 10% of allyl chloroacetate or vinyl chloroacetate. Alternatively, small amounts of fourth monomers as acrylonitrile and higher alkyl methacrylates may be included for further improved elastomers.

BACKGROUND OF THE INVENTION

Acrylic elastomers which normally contain a major proportion of lower alkyl esters of acrylic acid such as methyl acrylate, ethyl acrylate and butyl acrylate are limited to only a few cure methods and properties of the vulcanizates cannot be readily varied for a variety of applications.

Many alkyl acrylate copolymers have been proposed to provide improved cure systems for acrylic elastomers. Such copolymers include, for example, alkyl acrylates as ethyl acrylate with 1 to 5 parts of copolymerizable vinylidene monomers including, for example, halogen-containing monomers as chloroethyl vinyl ether, carboxyl-containing monomers as acrylic acid, epoxy-containing monomers, amide-containing monomers and monomers which provide "self-curing" copolymers such as N-methylol acrylamides or N-alkoxymethyl acrylamides, with carboxyl or other amide containing comonomers.

While such copolymers can be cured in a variety of methods, and while the vulcanizates have many desired physical properties, in general, they have not had a required balance of low temperature properties and oil resistance required for many applications.

SUMMARY OF THE INVENTION

Acrylate elastomers having an improved balance of low temperature flexibility and oil resistance, which also are readily vulcanized by a variety of vulcanizing agents, are obtained by polymerizing together greater than about 25% of alkoxy alkyl acrylates, less than about 70% alkyl acrylates and less than 10% of allyl or vinyl chloroacetate.

DETAILED DESCRIPTION

Useful alkoxy alkyl acrylates present in the copolymers in amounts greater than about 25 weight percent are represented by the structure $$CH_2=CHC\overset{O}{\overset{\|}{-}}O-R_1-O-R_2$$

wherein $R_1$ is an alkylene radical containing 1 to 4 carbon atoms and $R_2$ is an alkyl radical containing 1 to 4 carbon atoms or an alkoxy radical. Particularly useful are alkoxy alkyl acrylates wherein $R_1$ is —$CH_2$— or

—$CH_2$—$CH_2$— and $R_2$ is methyl, ethyl, methoxy ethyl or ethoxy ethyl. Typical alkoxy alkyl acrylates include methoxyethyl acrylate, methoxymethyl acrylate, ethoxyethyl acrylate, butoxyethyl acrylate, methoxyethoxyethyl acrylate, and the like. An optimum balance of low temperature properties and oil resistance has been obtained with the methoxy- and ethoxy ethyl acrylates. The amount of alkoxy alkyl acrylate employed preferably is at least about 25 weight percent of the polymer, but may be as high as about 80 weight percent. More preferably, the amount employed will be from about 30 to about 60 weight percent, both in the monomer mixture and the resulting interpolymers.

The amount of vinyl or allyl chloroacetate employed will be from greater than 0.1 percent based on the total monomers to less than 10 percent. From 0.5 to about 5 percent has resulted in useful properties while a range from 1 to 3 percent results in interpolymers that are readily cured or vulcanized with a variety of vulcanization agents and have an excellent balance of desired physical properties for elastomer applications. Polymers containing about 0.2 to about one, usually about 0.3 to 0.8 percent bound chlorine provided by the chloroacetates are particularly useful.

The acrylic elastomers of this invention contain less than 70 weight percent of acrylic acid esters having the structure $$CH_2=\overset{H}{\overset{|}{C}}-COOR$$

wherein R is a member of the class consisting of alkyl groups having from 1 to 10 carbon atoms, β-cyanoethyl and cyanoalkyl groups having from 2 to 8 carbon atoms. Representative lower alkyl acrylic esters are methyl acrylate, ethyl acrylate, the propyl acrylates, the butyl acrylates, the amyl acrylates, the hexyl acrylates, cyclohexyl acrylate, the heptyl acrylates, and the octyl acrylates; the cyanoalkyl acrylates such as α-cyanomethyl acrylate, α-cyanoethyl acrylate, β-cyanoethyl acrylate, the α, β and γ-cyanopropyl acrylates, the cyanobutyl acrylates, the cyanoamyl acrylates, the cyanohexyl acrylates and the cyanoheptyl acrylates; and the like. Most preferred in the present invention are the alkyl and cyanoalkyl acrylic esters in which the alkyl group contains from 1 to 4 carbon atoms. Mixtures of alkyl acrylates are particularly useful.

Other vinylidene monomers having a terminal $$CH_2=C<$$

group may be employed with the three essential monomers so long as an elastomeric material is obtained. Normally less than about 10% other vinylidene monomers will be used as vinylidene chloride, vinyl chloride, methacrylonitrile, vinyl ethers, octyl methacrylate and the like. Other copolymerizable monomers include such vinyl monomers as acrylonitrile, the styrenes as styrene, α-methyl styrene, vinyl toluene, p-chlorostyrene, nitrostyrene, vinyl chloride, vinylidene chloride, vinyl acetate, alkyl vinyl ethers, alkyl vinyl ketones, acrylic acid, methacrylic acid, methacrylate, ethyl methacrylate, methyl ethacrylate, acrylamide, methacrylamide, N-methylol acrylamide, octyl acrylate, alkyl fumarates and the like; and while not required, since adequate vulcanization is obtained with the allyl chloroacetate components of this invention, chloroethyl vinyl ether, chloroethyl acrylate, and the like. Particularly useful is less than 10%, as 2–6% acrylonitrile.

The acrylic elastomers of this invention normally have glass or second order transition temperatures below about 10° C. The interpolymers are readily prepared by methods employed by those skilled in the art in providing acrylic elastomers. While such polymerizations may be conducted in bulk or in solution, the preferred method is to polymerize the monomers in water in an aqueous dispersion. The polymerizations may be conducted in batch reactions or the monomers may be proportioned to a reactor containing water and other desired polymerization additives. The polymerizations may be conducted over a wide temperature range as from −10° C. to 95° C. While heat and ultra-violet light may be used, better results are generally obtained at temperatures in the range of about 5° C. to about 50° C. in the presence of water containing a free radical generating catalyst and surface active agents.

The catalyst employed may be any of those free radical forming and other catalysts known to those skilled in the art including both organic and inorganic peroxide, inorganic persulfates, organic hydroperoxides, azo compounds, the well known redox catalyst systems, and reduced metal catalysts. Other additives to the water will include acids or bases to adjust the pH of the aqueous dispersion which usually is in the range of about 4 to 8; buffers, inorganic salts and surface active agents. Since some of the alkyl acrylates are soluble in water only minimum amounts of surface active agents are normally required to form polymers. Larger amounts normally will be employed when stable latices are desired. Such surface active agents may include anionic, cationic and non-ionic materials. Typical surface active agents found useful in preparing the interpolymers include sodium alkyl sulfates as sodium lauryl sulfates, sodium alkyl aryl sulfonates, sodium naphthalene sulfonate, quaternary salts, polyglycol fatty acid esters and the like. As is obvious, the catalysts, surface active agents, and other polymerization conditions are not critical to obtaining the improved interpolymers of this invention. If the interpolymers are prepared in the form of latices and not used as such, the elastomers are normally isolated from the latex by coagulation with salt-acid, polyvalent metal salts, alcohol and the like, and the resulting solid interpolymer washed with water and dried. The examples represent only one method for preparing the acrylic elastomers. Cements may be prepared by polymerization in a solvent or dissolving the dry polymer in a solvent.

The resulting dried elastomers may contain or have added thereto stabilizers which are effective as antioxidants and antiozonants, and in many cases improved heat resistance of the elastomers is obtained by use of such stabilizers and organic phosphites. Use of both phosphites and other antioxidants as the phenol derivatives are suggested. The usual antioxidants and stabilizers may be added to the rubber in latex state, milled or in cements. Aryl phenols are preferred as they are non-staining, but aryl amines may be used. Age resistors and antioxidants of the known type such as octylated diphenylamines, styrenated phenols, polyalkyl polyphenols, PBNA, and others, may be used.

The novel polymers of this invention may be compounded with a variety of vulcanizing agents. Examples of the vulcanization systems which can be used with these acrylic elastomers are fatty acid soaps and dipentamethylene thiuram hexasulfide, fatty acid soap and sulfur, hexamethylene diamine, triethylene diamine, ammonium benzoate, ammonium adipate, ammonium stearate, zinc dimethyl dithiocarbamate sulfur and phenylene diamine, dicyandiamide with azelaic acid and the like. Also useful for special compounds are plasticizers, softeners, and tackifiers; and reinforcing pigments, for example, the various carbon blacks, both channel and furnace, inert fillers and diluents. All may be used as will be understood by those skilled in the compounding art.

EXAMPLES

A series of copolymers were prepared with the monomers set forth in the data table below. According to a polymerization recipe using, in weight parts: 100 of water, 0.072 sodium hydroxide, 2.10 alkyl phenoxypoly(ethyleneoxy)ethyl ester of phosphoric acid, 0.01 of the sodium ferric salt of ethylenediamine tetraacetic acid, 100 of monomers, 0.3 sodium sulfate, 0.024 tetrasodium ethylenediamine tetraacetate, 0.04 sodium formaldehyde sulfoxylate, 0.02 sodium hydrosulfite and 0.04 paramenthane hydroperoxide. The reaction was conducted at a temperature of 30° C. and the monomers proportioned over a two hour period. The initial pH of the water-emulsifier mixture was between 6 and 7. The polymers were coagulated with calcium chloride solution, washed and dried.

| Example | 1 | 2 | 3 | 4 | 5 |
|---|---|---|---|---|---|
| N-butyl acrylate | 49 | 50 | 49 | 24 | |
| Ethyl acrylate | | | | 45 | 97 |
| Acrylonitrile | 2 | | 2 | | |
| Methoxyethyl acrylate | 46 | 47 | 46 | 28 | |
| Vinyl chloroacetate | 3 | 3 | | 3 | 3 |
| Allyl chloroacetate | | | 3 | | |

The dry polymers were compounded to the following recipe:

| | |
|---|---|
| Polymer | 100 |
| FEF carbon black | 65 |
| Stearic acid | 2 |
| Phenyl-β-naphthylamine | 2 |
| Spider sulfur (sulfur dispersed with manganese carbonate) | 0.3 |
| Sodium stearate | 0.75 |
| Potassium stearate | 2.25 |

The compounds were vulcanized at 338° F. for four minutes and tempered at 347°. The resulting vulcanizates had the following physical properties:

| Example | 1 | 2 | 3 | 4 | 5 |
|---|---|---|---|---|---|
| 100% modulus, p.s.i | 820 | 770 | 700 | 720 | 740 |
| Tensile, p.s.i | 1,400 | 1,100 | 1,450 | 1,440 | 1,820 |
| Elongation, percent | 170 | 130 | 180 | 190 | 230 |
| Compression set: 70 hours/302° F. Plied discs | 31.4 | 35.6 | 24.5 | 39.9 | 36.3 |
| Gehman freeze, ° C | −37.5 | −41.0 | −38.5 | −31.0 | −14.0 |
| ASTM 3 oil: Percent volume swell 70 hours/302° F | 24.6 | 27.7 | 25.2 | 18.1 | 14.6 |
| Glass temperature raw polymer, ° C | −35 | −38 | −38 | −28 | −12 |
| Percent gel, raw polymer (0.4 MEK) | 83.4 | 84.0 | 12.0 | 81.1 | 74.5 |

The improved balance in low temperature flexibility and oil resistance of the polymers of this invention are shown by this data. Copolymers of 95% ethyl acrylate and 5% chloroethyl vinyl ether are not cured by the above recipe. The interpolymers containing allyl chloroacetate show even further advantages over the interpolymers containing vinyl chloroacetate in having a much lower compression set and minimum gel so that cements could readily be formed from this interpolymer. When the above examples are repeated with other alkyl acrylates and mixtures thereof, including for example, 15 parts of octyl acrylate and 82 parts of ethyl acrylate, with other alkoxy alkyl acrylates as ethoxyethyl acrylate or methoxy ethoxy ethyl acrylate, with about 1.5 to 5 parts of vinyl or allyl chloroacetate, and mixtures thereof, interpolymers with equivalent physical properties are readily obtained.

These improved vulcanizable acrylic elastomers are useful in applications where acrylic elastomers have been used in the past and find further uses not generally available to many acrylic elastomers because of a less desirable balance of low temperature flexibility and oil resistance. For example, in molded parts subject to attack by both heat and oils but where resistance to low temperature brittleness is required as in gaskets, cups, seals and the like.

I claim:
1. An acrylate interpolymer having a second order transition temperature below about 10° C. and containing polymerized together greater than 25% of an alkoxy alkyl acrylate, less than 70% of an alkyl acrylate and about 0.5 to less than 10% of an unsaturated chloroace- tate selected from the group consisting of allyl chloroacetate and vinyl chloroacetate.

2. The interpolymer of claim 1 wherein the alkoxy alkyl acrylate has the formula

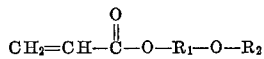

wherein $R_1$ is an alkylene radical containing 1 to 4 carbon atoms and $R_2$ selected from the group consisting of alkyl radicals containing 1 to 4 carbon atoms, methoxy ethyl and ethoxy ethyl, the alkyl acrylate has the formula

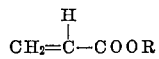

wherein R is selected from the group consisting of alkyl groups containing from 1 to 10 carbon atoms, β-cyanoethyl and cyanoalkyl groups containing 2 to 8 carbon atoms.

3. The interpolymer of claim 2 wherein in the alkoxy alkyl acrylate $R_1$ contains 1 to 2 carbon atoms and $R_2$ contains 1 to 2 carbon atoms, R of the alkyl acrylate contains 1 to 4 carbon atoms, the amount of alkoxy alkyl acrylate is from about 30 to about 60%, and the amount of chloroacetate is from about 1 to 5%.

4. The interpolymer of claim 3 wherein the alkoxy alkyl acrylate is methoxy- or ethoxyethyl acrylate and the interpolymer contains about 0.2 to about 1% chlorine derived from the interpolymerized chloroacetate.

5. The interpolymer of claim 3 wherein there is also included less than 10% acrylonitrile.

6. The interpolymer of claim 5 wherein a mixture of alkyl acrylates is employed.

7. The interpolymer of claim 5 wherein the chloroacetate is allyl chloroacetate present in amount to provide 0.3 to 0.6% bound chlorine in said interpolymer and the alkyl acrylate is ethyl acrylate.

8. The interpolymer of claim 1 in a vulcanized state.

9. The interpolymer of claim 5 in a vulcanized state.

10. The interpolymer of claim 7 in a vulcanized state.

References Cited

UNITED STATES PATENTS 3,397,193   8/1968   Aleta et al.

JOSEPH L. SCHOFER, Primary Examiner

STANFORD M. LEVIN, Assistant Examiner

U.S. Cl. X.R.

260—23, 41, 45.9, 45.95, 86.1